US008894399B2

(12) United States Patent
Stanley et al.

(10) Patent No.: US 8,894,399 B2
(45) Date of Patent: Nov. 25, 2014

(54) INJECTION MOLDING TOOL WITH INTEGRATED GATE REMOVAL FOR HIGH-VOLUME MANUFACTURING

(76) Inventors: Craig M. Stanley, Campbell, CA (US);
William Bredall, Pacifica, CA (US);
Kurt R. Stiehl, San Francisco, CA (US)

(*) Notice: Subject to any disclaimer, the term of this patent is extended or adjusted under 35 U.S.C. 154(b) by 172 days.

(21) Appl. No.: 13/531,435

(22) Filed: Jun. 22, 2012

(65) Prior Publication Data

US 2013/0082415 A1 Apr. 4, 2013

(30) Foreign Application Priority Data

Sep. 30, 2011 (CN) .......................... 2011 1 0361910

(51) Int. Cl.
*B23B 3/00* (2006.01)
*B29C 45/16* (2006.01)
*B29C 45/38* (2006.01)
*B29C 45/00* (2006.01)

(52) U.S. Cl.
CPC ............... *B29C 45/162* (2013.01); *B29C 45/38* (2013.01); *B29C 2045/0086* (2013.01)
USPC ............................ 425/112; 425/308; 425/215

(58) Field of Classification Search
CPC  B29C 45/02; B29C 45/1615; B29C 45/1759; B29C 45/2669; B29C 45/27; B29C 45/38
USPC .............. 425/121, 123, 129.1, 553, 588, 308, 425/309, 215–217, 112, 554, DIG. 51, 556, 425/436 R, 444; 264/250, 251, 294, 264, 264/153, 161, 163, 273–274, 364, 328.9, 264/334, 255, 275, 247
See application file for complete search history.

(56) References Cited

U.S. PATENT DOCUMENTS

| | | | |
|---|---|---|---|
| 4,010,596 A * | 3/1977 | Osterholt | ........................ 53/513 |
| 4,073,854 A | 2/1978 | Burry | |
| 6,103,165 A | 8/2000 | Miura | |
| 6,333,716 B1 | 12/2001 | Pontoppidan | |
| 6,790,027 B1 | 9/2004 | Callen et al. | |
| 2004/0224050 A1 * | 11/2004 | Hechtl | .......................... 425/554 |
| 2007/0278710 A1 * | 12/2007 | Ong et al. | ..................... 264/161 |

FOREIGN PATENT DOCUMENTS

JP           07156214 A  *  6/1995   .............. B29C 45/38

* cited by examiner

*Primary Examiner* — Yogendra Gupta
*Assistant Examiner* — Ninh Le
(74) *Attorney, Agent, or Firm* — Womble Carlyle Sandridge & Rice LLP

(57) ABSTRACT

Embodiments of a method of injection molding with two molding steps and tools for this method are described. The transfer tool for high-volume manufacturing allows transfer of molded parts from one injection molding tool to another injection molding tool without separating the molded part from runners and without degating. The single step transfer, which can be performed without degating and without separating the molded parts from one another, can reduce cycle time as well as complexity.

11 Claims, 6 Drawing Sheets

INJECTION MOLDING TOOL WITH INTEGRATED GATE REMOVAL FOR HIGH-VOLUME MANUFACTURING

CROSS REFERENCE TO RELATED APPLICATIONS

This application claims benefit of Chinese Patent Application No. 201110361910.9 filed on Sep. 30, 2011, which is hereby incorporated herein by reference.

BACKGROUND OF THE INVENTION

1. Field of the Invention

The present invention relates generally to methods of injection molding and a tool for forming injection molded parts. More particularly, the present invention relates to a method of injection molding parts with two molding steps and injection molding tools to make molding more efficient.

2. Description of the Related Art

Injection molding is one of the most popular processes for manufacturing plastic products. A typical injection molding process generally includes (1) injecting molten plastic material into a closed mold, (2) allowing the plastic to cool down and solidify, and (3) ejecting the finished product from the mold. This process may be used to form molded plastic parts, including for example, be used to form housings and accessories for various electronic products.

In some cases, injection molding can also be used to place decorative features on the outer surfaces of a part. In other cases, plastic can be molded over an already molded part to produce, for example, parts having two or more different colors or formed of two or more different materials. Formation of such features may be accomplished in two molding steps.

For example, the first molding step can be used to form the part (as described above for example), and the second molding step can be used to create an outer layer around some or all of the part (or vice versa). By way of example, injection molding in two steps may be used to place a soft layer on top of a hard layer, a transparent layer on top of an opaque layer, or create multicolored layers. In some cases, this molding process can be used to form the structural walls of the enclosure.

When one machine and tool set molds both shots, the tool is typically known as double-shot tool. Transferring a molded part from a first tool to a second tool for the second shot is known as transfer molding. A basic process can include injection molding a part, transferring this molded part to a second tool, and molding the second component on the transferred part. The transfer process can add complexity as well as cycle time to the process.

SUMMARY OF THE DESCRIBED EMBODIMENTS

This paper describes various embodiments that relate to systems, methods, and apparatus for injection molding parts with two molding steps.

According to one embodiment, an injection molding device for high-volume manufacturing is provided. The injection molding device includes a first tool and a second tool. The first tool, which is for performing a first injection molding shot, includes first shot gates that allow molten material to flow into cavities of the first tool. The second tool is for performing a second injection molding shot on the molded parts transferred from the first tool. The second tool has cavity spacing that matches the cavity spacing of the first tool and the second tool is configured to receive the molded parts transferred from the first tool with the first shot gates attached to the molded parts. The molded parts can be transferred from the first tool to the second tool without degating.

In accordance with another embodiment, an injection molding process is provided. According to the process, molded parts are transferred simultaneously from a first injection molding tool to a second injection molding tool. The molded parts are then loaded into the second injection molding tool prior to degating the molded parts.

According to yet another embodiment, an injection molding apparatus for high volume manufacturing is provided. The apparatus includes a first injection molding tool and a second injection molding tool. The first injection molding tool includes cavities spaced apart at a distance. The second injection molding tool has cavities spaced apart at a same distance as in the first injection molding tool, and the second injection molding tool also includes gate punches configured to remove gates from the first injection molding tool.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EXEMPLARY EMBODIMENTS

Figure 1:
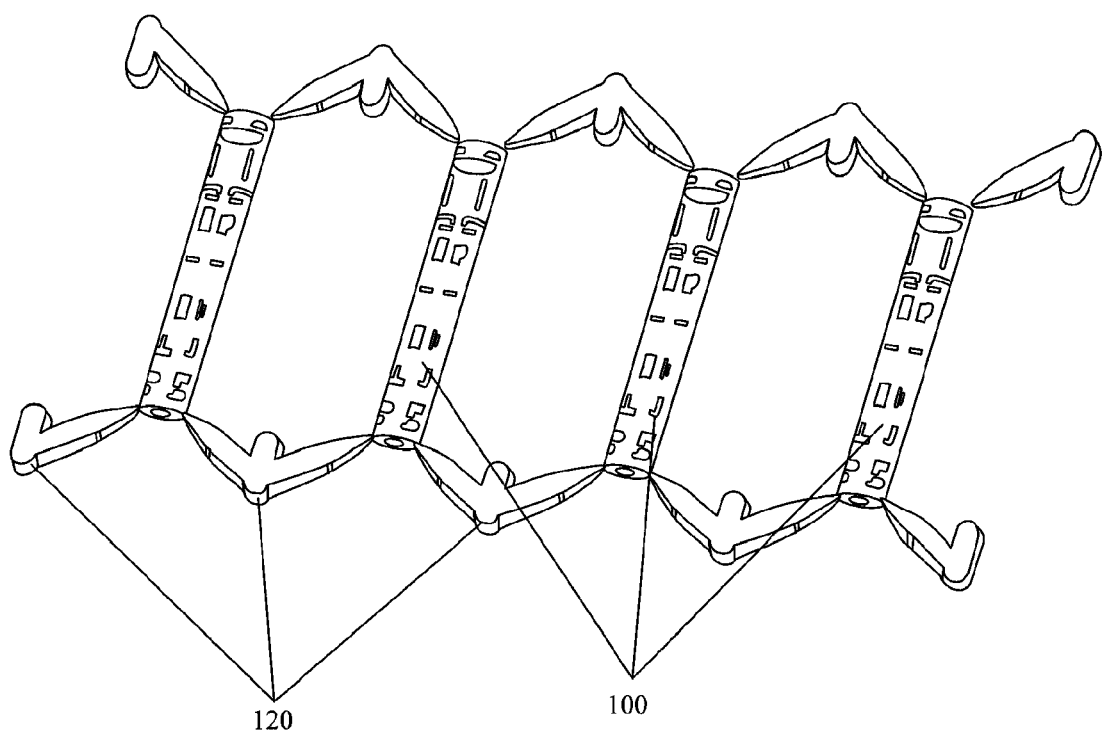
FIG. 1 is a top perspective view of four molded parts held together by and still connected to the runners from a first tool used to mold the parts.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

The embodiments described herein allow for much faster production rates since molded parts can be removed from a first injection molding tool and loaded into a second tool very quickly. Furthermore, a separate station is not needed for removal of the first shot gates.

In the following description, numerous specific details are set forth to provide a thorough understanding of the present invention. It will be apparent, however, to one skilled in the art that the present invention may be practiced without some or all of these specific details. In other instances, well known process steps have not been described in detail in order to avoid unnecessarily obscuring the present invention.

A typical injection molding apparatus includes a runner system for transporting molten plastic or another molten material to a mold cavity where a molded part is formed. A moldable material, such as plastic or metal, can be used in the injection molding apparatus described herein.

The runner system can include a gate, which is the location at which molten material can enter the mold cavity to form the molded part. The runner system can also include sprues, which are typically larger diameter channels through which molten material can flow. The runner system can also include several runners, which are smaller diameter channels that run from the sprue to the gate. Thus, molten material can flow through the runner system and enters the mold cavity through one or more gates to form a molded part in the mold cavity when the material cools and hardens.

After the molded part has hardened and cooled, it can be removed from the mold cavity and degated. Degating is a process of cutting runners away from the molded parts. Degating is typically performed to separate the molded part from the runner system when the molded part is removed from the mold cavity.

Sometimes, as noted above, the geometry or other processes require that the first molded part be physically transferred to a different mold before the second part is molded. Such a process is known as transfer molding. In transfer molds with more than one mold cavity, molded parts are usually ejected from the tool, degated (if needed), and then individually put into a second tool for the second molding shot.

Existing methods and tooling for a transfer molding process require molded parts to be collected from the first tool, degated, and then individually loaded into the second tool. Often, all of the first shot molded parts are either degated in the first tool, or in a separate fixture. An embodiment described herein combines the second shot molding process with the degating and therefore eliminates a separate degating step, and allows faster loading of the molded parts in the second tool. It also eliminates the need for a separate degating fixture, as the degating can be performed in the second molding tool.

An embodiment described herein allows the easy transfer of a large number of molded parts from a first molding tool to a second molding tool without separating the molded parts and without degating. Instead, in this embodiment, a first set of molded parts can be transferred from the first molding tool and loaded into the second molding tool while still connected by the runner system. The second molding tool can include integrated punches that remove the runner system to degate as it closes.

FIG. 1 shows four individual molded parts 100 that are held together by and still connected to the gates 120 from a first tool used to mold the parts 100. The molded parts 100 remain connected by gates. As shown in FIG. 1, a gate 120 is positioned between two molded parts. It will be understood that, in the embodiment illustrated in FIG. 1, four molded parts 100 are shown but that any number of molded parts can be provided. According to an embodiment, the molded parts 100, which are formed in a first injection molding tool, can be transferred to a second injection molding tool 200 (FIG. 2) for the second shot of an injection molding process without separating the molded parts 100 from the gates 120 of the first tool. By eliminating the degating step, cycle times can be reduced and the need for a separate degating fixture can be eliminated.

Furthermore, since the molded parts 100 remain connected to the gates 120, they can be loaded into the second injection molding tool 200 together in a single transfer step rather than having individual molded parts separately loaded into the second tool 200. Thus, after the first shot, the molded parts 100 are transferred simultaneously from the first tool to the second tool 200 for the second shot of the injection molding process.

In the illustrated embodiment, molten material flows into the gates 120 from runners (not shown) and the molten material then flows into each of the four corners of the cavity to form the molded part. Thus, as shown in FIG. 1, a gate 120 is connected at each of the four corners to the molded part 100 so that molten material can flow into the mold cavity through each one of the gates in the corners. It will be understood, however, that any number of gates can be provided for each cavity, depending on the geometry of the part.

Figure 2:
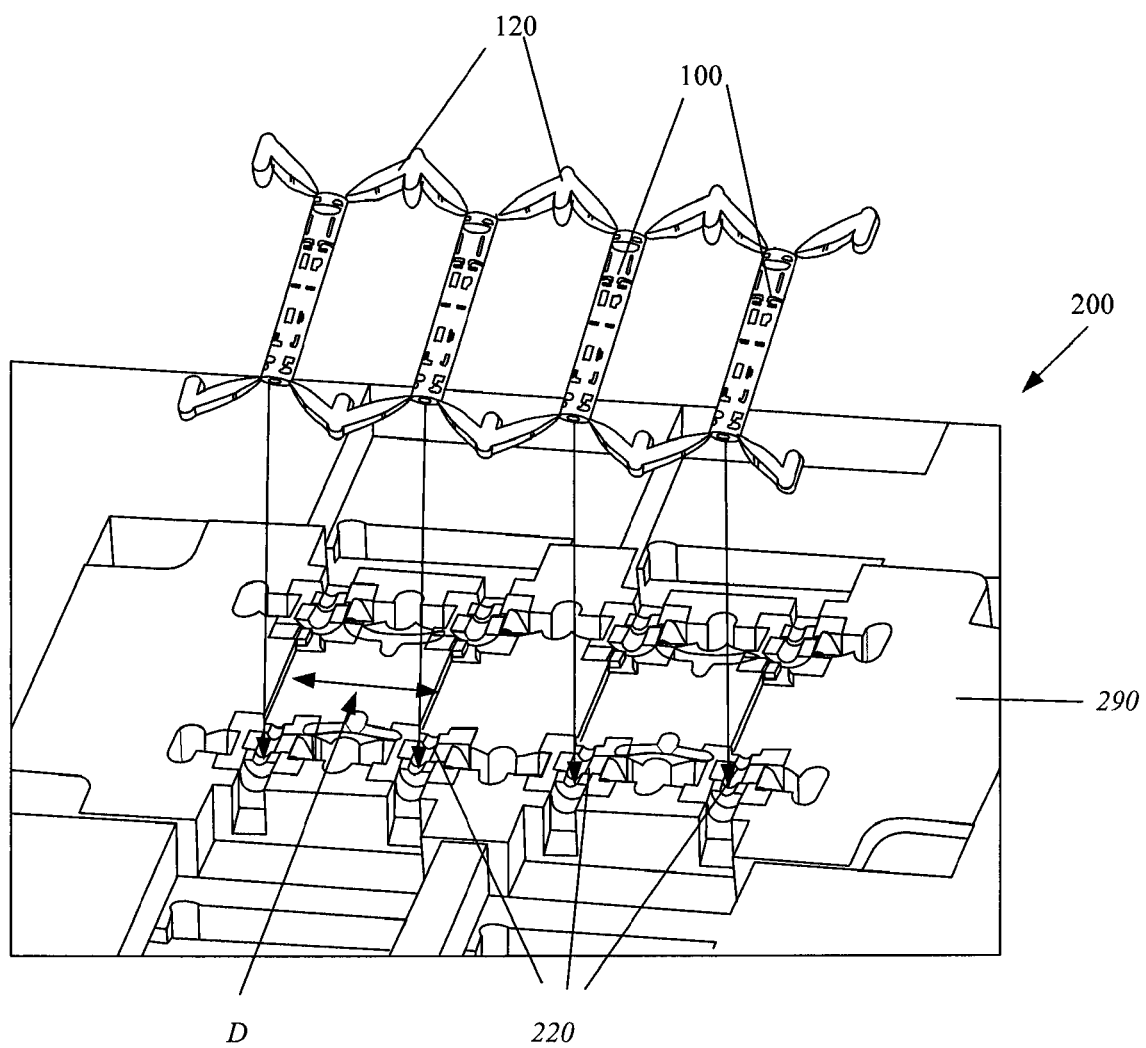
FIG. 2 shows molded parts from the first injection molding tool still connected to the gates being loaded into a second injection molding tool.

FIG. 2 shows the molded parts 100 being loaded into a second injection molding tool 200 while the molded parts 100 are still connected to each other via the gates 120 from the first tool. In the second injection molding tool 200, the spacing D between the mold cavities 220 is the same as that of the first tool (minus a small amount to account for runner shrinkage during cooling in some embodiments) so that the molded parts 100 can be easily transferred in one step, while still connected to each other via the gates 120, from the first tool to the second tool 200. That is, the molded parts 100 can be transferred directly from the first tool to the second tool without being separated from one another or degated. Thus, a separate degating fixture is not necessary. Further, the transfer of the molded parts 100 can be done in a single step with the molded parts 100 connected via the gates 120.

Figure 3:
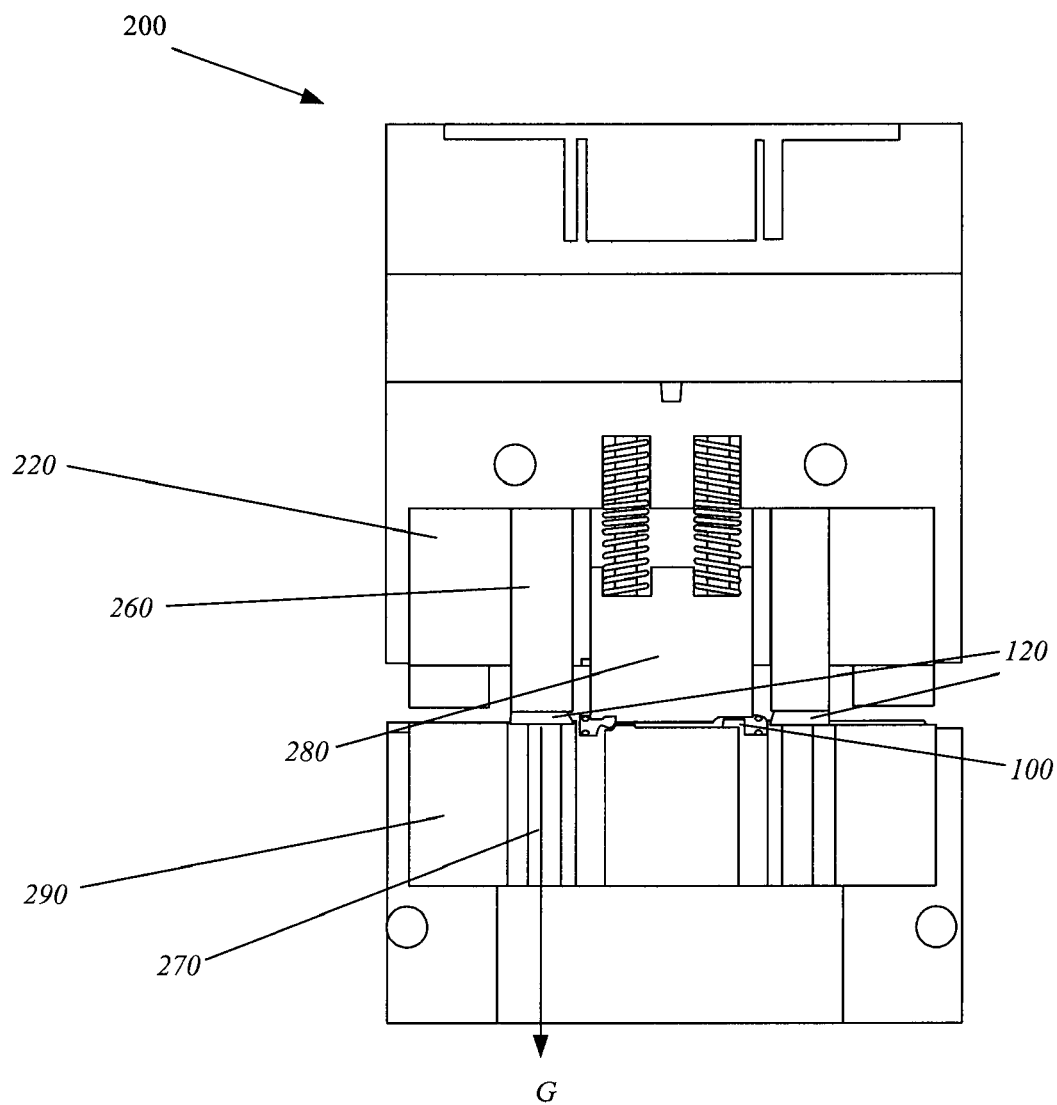
FIG. 3 is a side cross-sectional view of the molded part in the second injection molding tool prior to being degated.

FIG. 3 is a side cross-sectional view of the second tool 200 with a molded part 100, which has been molded in the first tool, held in a mold cavity 220 of the second tool. As noted above, the second tool 200 has cavity spacing that matches that of the first tool (minus any shrinkage) in order to receive the molded part 100 from the first tool with the gates 120 still attached. The second molding tool 200 can also have integrated gate punches 260 for degating to remove the gates 120 as the mold cavity 220 closes. As the mold cavity 220 of the second tool 200 closes, a spring loaded retention block 240 can hold the molded part 100 in place before gate punches 260 make contact with the gate 120. Thus, in this embodiment, the degating process for the gates 120 from the first tool is integrated with the second injection molding tool 200.

Figure 4:
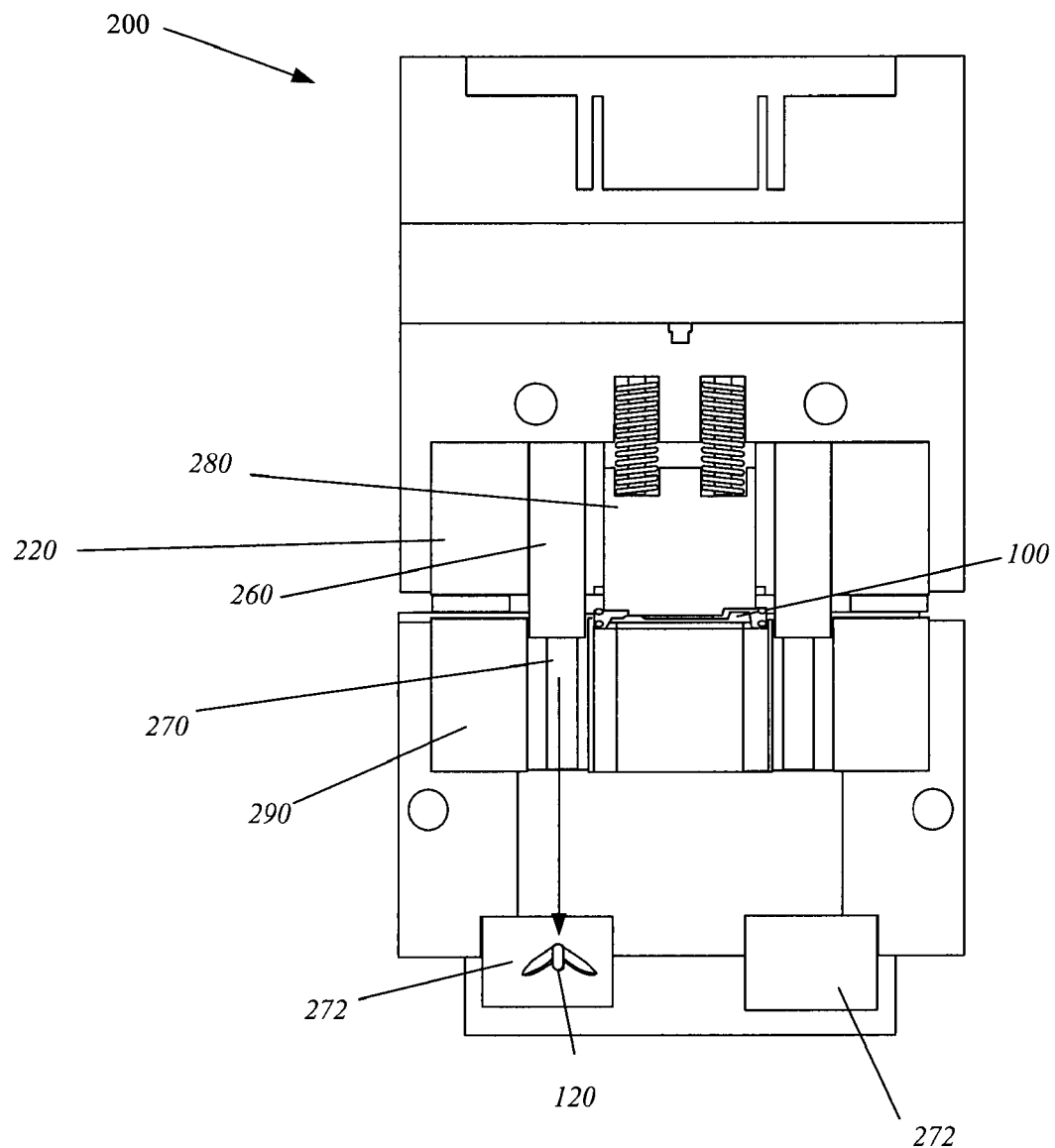
FIG. 4 is a side cross-sectional view of the molded part in the second injection molding tool after being degated.

A spring biased retention block 280 can be provided to hold the molded part 100 in place before the gate punches 260 make contact with the gates 120. In this embodiment, the gate punches 260 make contact with the gates 120 as the mold cavity block 220 closes onto the core 290. As the mold cavity block 220 and core 290 are closing but before they are fully closed, the gate punches 260 make contact with each gate 120, as shown in FIG. 3. As can be seen in FIG. 3, the gate punches 260 are positioned such that they move with the moving side of the cavity block 220. FIG. 4 shows that, as the mold cavity block 220 closes, the gate punches 260 move downward and apply force to each gate 120 to degate the molded part 100. In this embodiment, the gate punches 260 can move in a downward motion and apply force to the gates 120 from above when the mold cavity blocks 220 are in the closed position.

As degating of the first molded parts 100 occurs, each of the gates 120 is removed from the molded parts 100 and falls through a channel 270 provided under each gate 120 in the direction of arrow G, as shown in FIG. 3. As illustrated in FIG. 3, the channels 270 can pass through the core 290 of the second tool 200. As shown in FIG. 4, the gates 120 can then pass out of the second tool 200 through another channel 272. In an embodiment, the gates 120 can be air blasted out of the channel 272.

Figure 5:
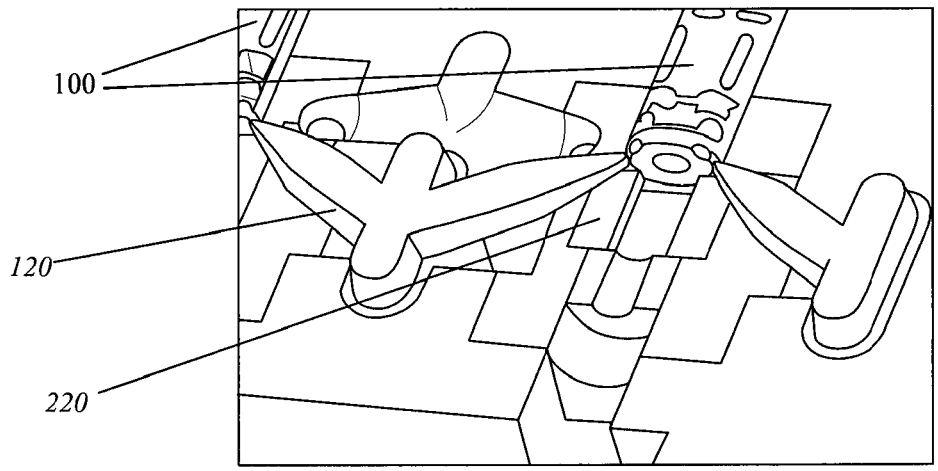
FIG. 5 is a top perspective view of molded parts, still connected to one another and the gates from the first tool, loaded in their respective mold cavities of the second injection molding tool.
Figure 6:
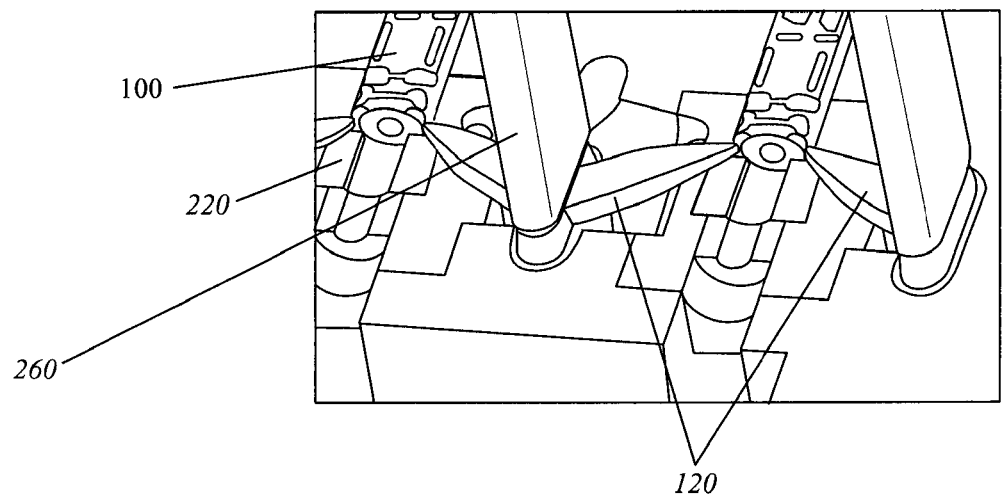
FIG. 6 is a top perspective view of the molded parts of FIG. 5 with the gate punches of the second tool contacting the gates of the first tool.

FIGS. 5 and 6 show details of the degating process of the first molded part 100 in the second tool 200. It will be understood that, in this embodiment, the part 100 that was molded in the first tool is degated to separate the molded part 100 from the gates 120 of the first tool before the second injection molding shot takes place in the second tool 200.

FIG. 5 is a top perspective view of molded parts 100, still connected to one another and the gates 120 from the first tool, loaded in their respective mold cavities 220 of the second injection molding tool 200. FIG. 6 is a top perspective view of the molded parts 100 shown in FIG. 5 with the gate punches 260 of the second tool 200 contacting the gates 120 of the first tool.

As discussed above, the gate punches 260 in this embodiment contact the gates 120 from above and move to push the gates 120 in a downward motion to detach them from the molded parts 100. As shown in the illustrated embodiment shown in FIG. 6, the gate punches 260 contact the central portions of the gates 120 to push the gates 120 in a downward motion. When the gates 120 are detached from the molded parts 100, the gates 120 fall into the channels 270 located below the gates 120. In some embodiments, the degated gates 120 can be stacked in the channels 270. In an embodiment, the channels 270 can be shaped accordingly so that the gates 120 can be stacked in the channels 270. For example, each channel 270 can have a cross-sectional shape that corresponds with that of the gate 120. In an embodiment, the channel 270 can have a shape such that when the gate 120 is pushed downward, the gate 120 cannot shift horizontally, thereby forcing the gate 120 to be pulled from the molded part 100.

Figure 7:
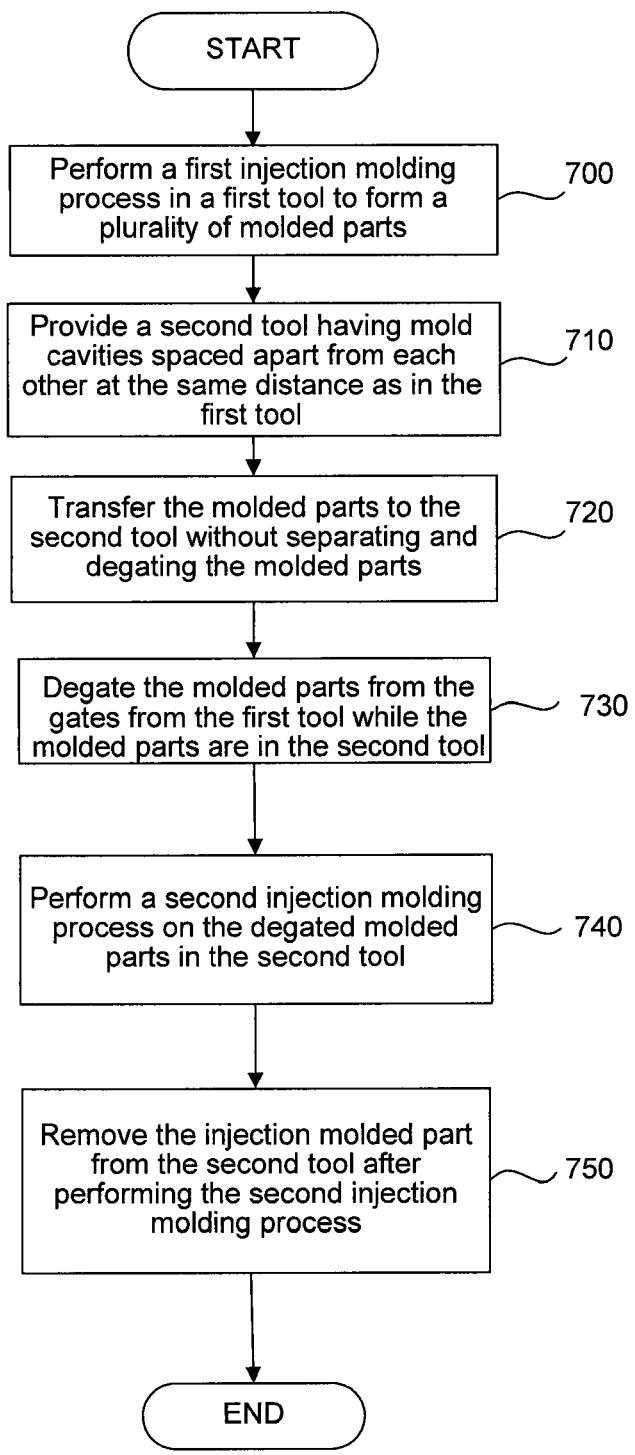
FIG. 7 is a flow chart of an injection molding process method according to an embodiment.

A molding process in which molded parts are transferred from one injection molding tool to another injection molding tool will be described with reference to FIG. 7. A molding process will be described below with reference to steps 700-750. In step 700, a first injection molding process is performed in a first injection molding tool to form molded parts.

In step 710, a second injection molding tool is provided. The second injection molding tool has mold cavities that are spaced apart from each other the same distance as in the first injection molding tool. This spacing allows molded parts from the first injection molding tool to be transferred to the second tool together in a single step. Thus, in step 720, the molded parts are transferred from the first tool to the second tool without separating and degating the molded parts. The molded parts are therefore transferred simultaneously from the first injection molding tool to the second injection molding tool.

In step 730, the molded parts are separated from the gates of the first tool while the molded parts are in the second tool. After degating the molded parts, a second injection molding process (or the second shot) can be performed on the molded parts in the second tool in step 740. In step 750, the injection molded part made from two injection molding processes steps can be removed from the second tool.

The foregoing description, for purposes of explanation, uses specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An injection molding system for forming a plurality of molded parts, each molded part including a first portion and a second portion, the injection molding system comprising: a first tool for performing a first injection molding shot forming the first portion of each of the molded parts, the first tool comprising a plurality of first cavities for forming a plurality of the first portions and at least one gate that allows molten material to flow into the first cavities, wherein each of the plurality of the first portions are connected to a gate portion formed from the molten material within the at least one gate; and a second tool for performing a second injection molding shot forming the second portion on each of the plurality of the first portions of the molded parts transferred from the first tool, wherein the second tool has a plurality of second cavities for forming a plurality of the second portions of the plurality of parts, the second tool comprising: at least one punch configured to press on and remove the gate portion from each of the plurality of the first portions, and at least one channel arranged to accept the removed gate portion, the at least one channel having a cross-sectional shape in accordance with the gate portion preventing shifting of the gate portion during removal; wherein the plurality of first cavities and the at least one gate are configured such that the plurality of first portions are maintained a first distance apart from one another by the gate portion when the plurality of first portions and gate portion are transferred from the first injection molding tool to the second injection molding tool.

2. The injection molding system as recited in claim 1, wherein the gate portion includes a central portion and at least two wing portions radially extending from the central portion.

3. The injection molding system as recited in claim 2, wherein the cross-sectional shape of each channel includes at least two wing channel portions corresponding to the at least two wing portions.

4. The injection molding system as recite in claim 2, wherein the at least one punch has a shape in accordance with the central portion of the gate portion.

5. The injection molding system as recited in claim 1, wherein the cross-sectional shape of the at least one channel allows for stacking of a plurality of the removed gate portions therein.

6. The injection molding system as recited in claim 1, wherein the injection molding system is configured to transfer a plurality of the molded parts simultaneously from the first tool to the second tool.

7. An injection molding system for manufacturing a plurality of parts, the injection molding system comprising: a first injection molding tool for forming a plurality of first portions of the plurality of parts, the first injection molding tool having a plurality of first cavities for forming the plurality of first portions and a plurality of gates that allow a molten molding material to follow into the first cavities, wherein each of a plurality of sets of the plurality of first portions are connected to a gate portion formed from the molten material within respective gates; and a second injection molding tool for forming a plurality of second portions on the plurality of first portions, the second injection molding tool having a plurality of second cavities for forming the plurality of second portions, wherein the second injection molding tool includes a punch configured to press on and remove the gate portion from the plurality of first portions, wherein the second injection molding tool includes a channel arranged to accept the removed gate portion, the channel having a cross-sectional shape in accordance with the gate portion preventing shifting of the gate portion during removal; wherein the plurality of first cavities and the plurality of gates are configured such that the plurality of first portions are maintained a first distance apart from one another by the gate portion when the plurality of first portions and gate portion are transferred from the first injection molding tool to the second injection molding tool.

8. The injection molding system as recited in claim 7, wherein the plurality of first cavities are spaced a distance apart from one another and the plurality of second cavities are spaced a distance from one another.

9. The injection molding system as recited in claim 7, wherein the injection molding system is configured to transfer the plurality of first portions molded in the first injection molding tool simultaneously to the second injection molding tool.

10. The injection molding system as recited in claim 9, wherein the injection molding system is configured to transfer the plurality of first portions without separating the plurality of first portions from the gate portion.

11. The injection molding system as recited in claim 7, wherein the gate portion includes a central portion and at least two wing portions radially extending from the central portion, wherein the cross-sectional shape of the channel includes at least two wing channel portions corresponding to the at least two wing portions.

* * * * *